United States Patent
Levy et al.

(10) Patent No.: US 12,230,256 B2
(45) Date of Patent: Feb. 18, 2025

(54) INPUT-AWARE AND INPUT-UNAWARE ITERATIVE SPEECH RECOGNITION

(71) Applicant: Verint Americas Inc., Alpharetta, GA (US)

(72) Inventors: Michael Levy, Alpharetta, GA (US); Jay Miller, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 166 days.

(21) Appl. No.: 17/886,859

(22) Filed: Aug. 12, 2022

(65) Prior Publication Data

US 2024/0054995 A1 Feb. 15, 2024

(51) Int. Cl.
*G10L 15/05* (2013.01)
*G10L 15/18* (2013.01)
*G10L 15/22* (2006.01)

(52) U.S. Cl.
CPC .......... *G10L 15/1815* (2013.01); *G10L 15/05* (2013.01); *G10L 15/1822* (2013.01); *G10L 15/22* (2013.01)

(58) Field of Classification Search
CPC ..... G10L 15/1815; G10L 15/04; G10L 15/22; G10L 2015/223; G10L 15/26; G10L 2015/088; G10L 2015/221; G10L 15/08; G10L 15/1822; G10L 15/30; G06F 40/30; G06F 40/40
See application file for complete search history.

(56) References Cited

U.S. PATENT DOCUMENTS

| | | | |
|---|---|---|---|
| 9,953,638 B2* | 4/2018 | Willett | G10L 15/20 |
| 2016/0027440 A1* | 1/2016 | Gelfenbeyn | G10L 15/02 704/244 |
| 2016/0260434 A1* | 9/2016 | Gelfenbeyn | G10L 15/02 |
| 2017/0316780 A1* | 11/2017 | Lovitt | G10L 15/30 |
| 2019/0325870 A1* | 10/2019 | Mitic | G10L 15/22 |
| 2023/0176550 A1* | 6/2023 | Cella | G05B 23/0283 700/117 |
| 2023/0176557 A1* | 6/2023 | Cella | G05B 23/024 700/117 |
| 2024/0055018 A1* | 2/2024 | Levy | G10L 25/78 |

* cited by examiner

*Primary Examiner* — Vijay B Chawan
(74) *Attorney, Agent, or Firm* — Meunier Carlin & Curfman LLC

(57) ABSTRACT

An interactive voice response (IVR) system including iterative speech recognition with semantic interpretation is deployed to process an audio input in a manner that optimizes and conserves computing resources and facilitates low-latency discovery of start-of-speech events that can be used to support external processes such as barge-in operations. The IVR system can repeatedly receive an audio input at a speech processing component and apply an input-aware recognition process to the audio input. In response to generating a start-of-speech event, the IVR system can apply an input-unaware recognition process to the remaining audio input and determine a semantic meaning in relation to the relevant portion of the audio input.

20 Claims, 11 Drawing Sheets

| Timeframe | Speech Transcription | Semantic Match Output |
|---|---|---|
| 0 to 0.5 | | |
| 0.2 to 0.7 | | |
| 0.5 to 1 | | |
| 0.8 to 1.3 | I | Start of speech event detected |
| 1.1 to 1.6 | I want to | |
| 1.1 to 2.3 | I want to pay | |
| 1.1 to 3 | I want to pay my bill | Semantic match found |

Input-Aware Recognition Process (rows 0 to 0.5 through 0.8 to 1.3)
Input-Unaware Recognition Process (rows 1.1 to 1.6 through 1.1 to 3)

INPUT-AWARE AND INPUT-UNAWARE ITERATIVE SPEECH RECOGNITION

BACKGROUND

Customers can interact with computer systems using speech. Semantic analyzers can be used to determine the meaning of a customer's speech, which can be an input to the computer system. Distinguishing actual speech from noise in real-time is challenging and may degrade customer experience with various systems including interactive voice response (IVR) systems.

SUMMARY

The present disclosure describes methods and systems for generating a start-of-speech event (e.g., identifying a start point indicative of the beginning of actual speech or communication). An IVR system can be used to receive an audio input, for example a recording or stream from an IVR call. An issue with speech recognition systems such as IVR systems is speech end-pointing and speech activity detection (e.g., determining when actual speech begins in real-time). Long recognition sessions, such as those that are active while an IVR prompt plays to a caller, commonly consume high computing resources despite processing audio inputs that comprise mostly silence. Further, such sessions do not provide for a prompt barge-in protocol.

Barge-in may refer to an interruption of an IVR prompt by a caller that can occur when the caller does not require further information to communicate instructions or responses to an IVR system. For example, an IVR prompt may be acting as a menu system, enumerating several options: "To pay a bill, say 'billing.' To check your balance, say 'balance.'" Once the user has heard the option they require, speaking—barging in—aborts the remainder of the prompt such that the caller can move on immediately. In another common situation, an IVR prompt may support barge-in to allow a frustrated caller to say "operator" or "agent." In this way, callers can bypass an IVR system that isn't working as intended. However, many IVR systems may be unable to accurately determine when a caller begins to speak, for example, in order to facilitate barge-in while an IVR prompt is playing.

Accordingly, embodiments of the present disclosure include speech recognizer systems that can include a semantic analyzer that can determine the semantic meaning of speech. Embodiments of the present disclosure leverage high-performance sliding windows where incoming audio samples are processed and analyzed by a speech recognition engine to determine if actual speech is present. If a cough, grunt or background noise is heard, it will not result in actual speech detected, and the noise will be ignored. Only when the speech recognizer determines that it has heard actual speech will the start-of-speech event be logged. This approach allows the speech recognizer to provide low-latency speech activity detection and avoid triggering a start-of-speech event on non-speech noise.

In accordance with the present disclosure, a method for processing an audio input using an iterative speech recognition system is provided, where the method includes: receiving the audio input at a speech processing component; applying an input-aware recognition process to the audio input to generate a start-of-speech event; responsive to generating the start-of-speech event, applying an input-unaware recognition process to a remaining audio input to determine silence, unexpected speech, or expected speech; and initiating a response in accordance with the audio input.

In accordance with another embodiment of the present disclosure, a computer system for processing an audio input is described where the computer system includes: a processor and; a memory operably coupled to the processor, the memory having computer-executable instructions stored thereon that, when executed by the processor, cause the processor to: receive the audio input at a speech processing component; apply an input-aware recognition process to the audio input to generate a start-of-speech event; responsive to generating the start-of-speech event, apply an input-unaware recognition process to a remaining audio input to determine silence, unexpected speech, or expected speech; and initiate a response in accordance with the audio input.

In accordance with yet another embodiment of the present disclosure, a non-transitory computer readable medium comprising instructions that, when executed by a processor of a processing system, cause the processing system to perform a method for processing an audio input, comprising instructions to: apply an input-aware recognition process to the audio input to generate a start-of-speech event; responsive to generating the start-of-speech event, apply an input-unaware recognition process to a remaining audio input to determine silence, unexpected speech, or expected speech; and initiate a response in accordance with the audio input.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Overview

Figure 1:
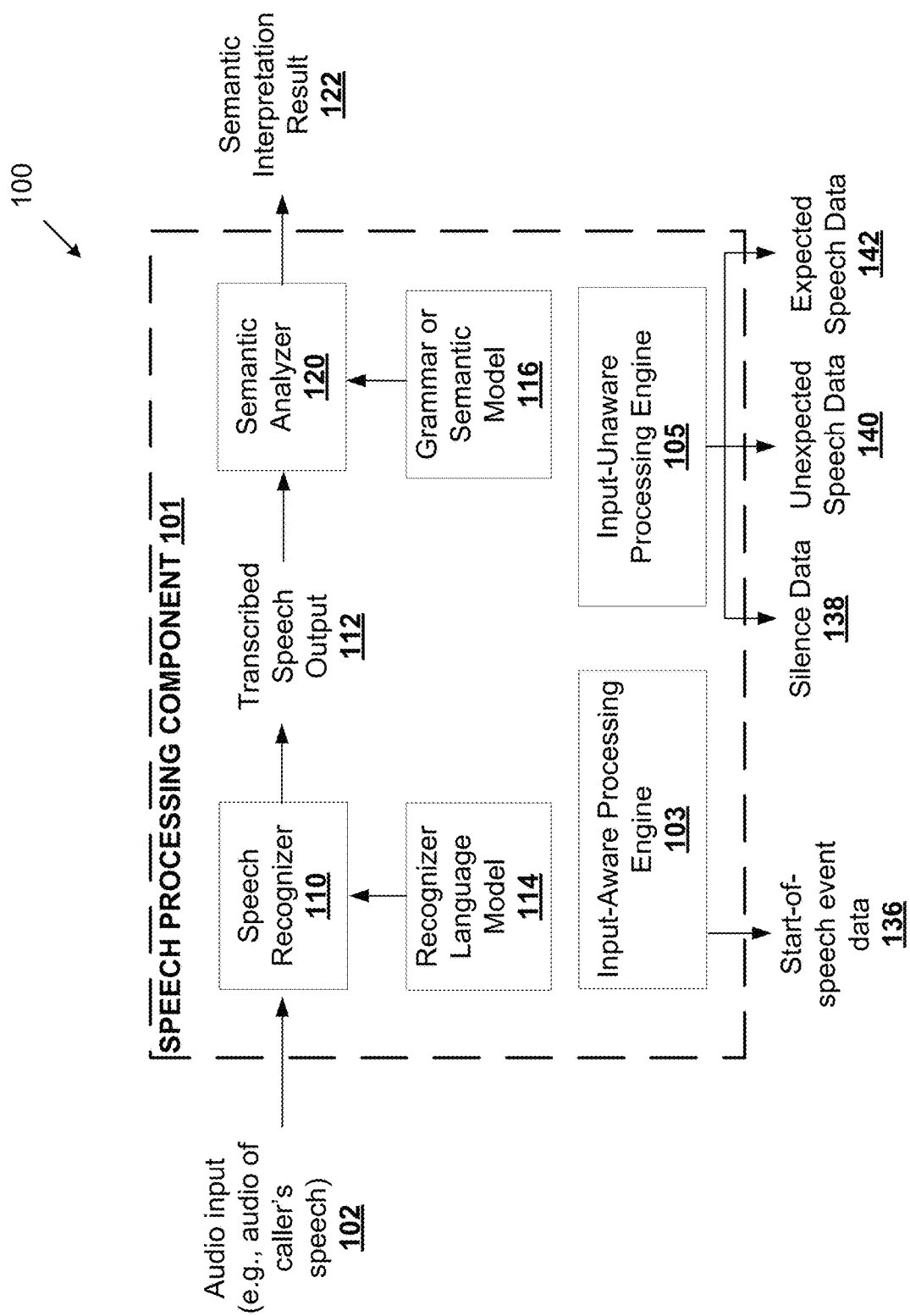
FIG. 1 illustrates a system that can be used to process an audio input according to certain embodiments.

An IVR system can be used to receive an audio input, for example a recording or stream from an IVR call to enable a caller or user to interact with, for example, a call center without speaking to an agent. An issue with speech recognition systems used by IVR systems is speech end-pointing and speech activity detection (e.g., determining when actual speech begins in real-time). Long recognition sessions, such as those that are active while an IVR prompt plays to a caller, commonly consume high computing resources despite processing audio inputs that comprise mostly silence.

The present disclosure is directed to a system that can be used to receive an audio input and generate start-of-speech events (e.g., identifying a start point indicative of the beginning of actual speech or communication), such as those received by IVR systems that may be used to improve responsiveness of the IVR systems. In some examples, the system can distinguish between ambient noise or background noise (e.g., a cough or similar sound) and human speech. As an example, the system can be used as part of a call center, where the human speech is speech from a customer speaking into a telephone, or other systems where speech is analyzed as input data to a system, such as a mobile phone, a smart home system, smart switches, desktop computers, automobiles, etc.

Some speech recognition engines use signal processing techniques to analyze incoming audio in order to distinguish silence or noise from actual speech that should be processed. However, such approaches are susceptible to false positive results where a noise (e.g., cough, grunt, or background noise) may be incorrectly interpreted as a start-of-speech event. Certain IVR systems may implement signal processing techniques which may rely on, for example, without limitation, energy detection in an audio input to detect speech. However, such approaches are suboptimal for determining whether an audio window contains noise or speech in real-time due in part to a propensity for false positive results. For example, such IVR systems may analyze an audio window containing a cough which has a high-energy signal and prematurely initiate a barge-in protocol. Barge-in, generally, is an ability for a user to interrupt an IVR system and may refer to a process of stopping, bypassing, or pausing an automated IVR prompt in response to detected speech. Barge-in can occur in response to a user's speech and causing an IVR prompt to pause or stop, and prematurely initiating a barge-in protocol can be frustrating for callers or users.

In iterative speech recognition systems, audio data is collected over time in an iterative fashion and may be processed in parallel. As the amount of audio data increases, the technical complexity and amount of computing resources required to analyze the audio data increases significantly. Additionally, many IVR systems which rely on cloud-based processing systems to analyze speech exhibit a noticeable lag which degrades the user experience. Approaches including streaming recognition systems and tuning iteration time and audio window size can provide better performance, however such techniques may have high computational costs. For example, such systems may require significant resources in order to process long audio inputs.

Embodiments of the present disclosure provide a speech recognition engine that more accurately generates start-of-speech events and provides capabilities to improve the responsiveness of the IVR system. For example, in response to barge-in events, in an iterative speech recognition system (e.g., one using a cloud-based recognizer), once a session extends past a few seconds, iteration times may be much slower so that speech detection is no longer a viable trigger for barge-in. By way of example, an outbound IVR prompt may continue to play even when a user begins to speak which can be frustrating for the user. An IVR system that implements embodiments of the present disclosure improves the user experience as the IVR is more responsive to events such as barge-in.

Accordingly, embodiments of the present disclosure include speech recognizer systems that can include a semantic analyzer that can determine the semantic meaning of speech. Embodiments of the present disclosure leverage high-performance sliding windows where incoming audio samples are processed and analyzed by a speech recognition engine to determine if actual speech is present. If a cough or grunt or background noise is heard, it will not result in actual speech detected, and the noise will be ignored. Only when the speech recognizer determines that it has heard actual speech will the start-of-speech event be logged. This approach allows the speech recognizer to provide low-latency speech activity detection and avoid triggering start-of-speech event on non-speech noise.

The system can include a sub-system for transcribing the speech into text, referred to herein as a "speech recognizer." For example, the speech recognizer can receive an audio file or audio stream from the customer and transcribe that audio stream into text in real-time. A speech recognizer can use one or more language models which can prescribe the way phonemes (e.g., audio) map to morphemes (e.g., text or transcriptions). In some embodiments, a speech recognizer may associate a confidence value with its output that allows the system to activate workflows like retries or disambiguation. In some embodiments, a speech recognizer may output a plurality of candidate transcriptions which, when paired with confidence values, can move the burden of finding the correct transcription downstream.

The system can also include a sub-system for determining the meaning of the text that was transcribed by the speech recognizer, referred to herein as a "semantic analyzer." As an example, the semantic analyzer can determine the logical meaning of a string of text produced by the speech recognizer. The output of the semantic analyzer can be checked by the system to determine if it corresponds to a valid input to the system. For example, "sure" can be a valid response to a prompt requesting the user's permission to send a text message, but "sure" can be an invalid response to a prompt requesting that the user state their account number.

The system can further process an audio input (e.g., audio stream, audio data, or the like) to generate a start-of-speech event (e.g., when a user begins to speak with an IVR system) by applying an input-aware recognition process, as discussed in more detail herein. In response to generating a start-of-speech event, the system can apply (e.g., trigger, activate, or the like) an input-unaware recognition process to the remaining audio input (e.g., a secondary portion of an audio input), and can use a speech recognizer and/or semantic analyzer to process the remaining audio input. In so doing, and for both local recognition engines and cloud recognition engines, embodiments of the present disclosure optimize available computing resources, improve processing speeds and memory usage, reduce usage costs (particularly in cloud-based applications) and more accurately facilitate barge-in operations. This approach allows an iterative speech recognition system to provide low latency speech activity detection and avoid triggering start-of-speech events in response to noise. In general, speech recognizers are resource intensive and complex. Embodiments of the present disclosure provide a resource-efficient, high-quality system with low false-positive rates.

Example Environment and Processes

FIG. 1 illustrates an example overview schematic of a system that implements iterative speech recognition including semantic interpretation in accordance with the present disclosure.

With reference to FIG. 1, the present disclosure includes a system 100 for analyzing an audio input 102. The system 100 can include a speech processing component 101 that is configured to perform input-aware recognition processes and input-unaware recognition processes.

The speech processing component 101 can be configured to process an audio input 102 (e.g., audio stream) using an input-aware recognition process. The input-aware recognition process can include iteratively applying an overlapping, high-frequency constant size audio window in order to generate a start-of-speech event. In some embodiments, the input-aware recognition process uses a sliding audio window of a fixed size (e.g., 0.5 seconds or 1 second) until a start-of-speech event is generated. As depicted in FIG. 1, the speech processing component 101 can include a speech recognizer 110 that can use a recognizer language model 114 to create a transcribed speech output 112. The speech recognizer 110 may be used to detect speech to signal that a start-of-speech has occurred. The speech recognizer 110 can also be referred to as an "automatic speech recognizer" or "ASR." ASR's can be used in telephony applications including interactive voice response (IVR) systems. IVR systems can include both an ASR component and a component for determining the semantic meaning of the recognized speech. IVR systems can also identify if a semantic match has occurred while collecting and recognizing speech audio from the caller. In some embodiments, as further depicted in FIG. 1, the speech processing component 101 comprises an input-aware processing engine 103 that can be configured to apply (e.g., perform, implement, or the like) an input-aware recognition process and generate start-of-speech event data 136, as discussed in more detail herein. Additionally, the speech processing component 101 comprises an input-unaware processing engine 105 that can be configured to apply (e.g., perform, implement, or the like) an input-unaware recognition process and generate silence data 138, unexpected speech data 140, and expected speech data 142, as discussed in more detail herein.

The speech processing component 101, which can include the speech recognizer 110 and the semantic analyzer 120 as depicted in FIG. 1, can be implemented by a processor and memory (e.g., as a program stored on a computer readable medium). The speech recognizer 110 can also be implemented using a program that is configured to receive audio input 102 and produce text transcription, referred to herein as a "speech recognition engine." The speech recognition engine that can be used to implement the speech recognizer can be implemented using a processor and memory (e.g., a computer readable medium). In some embodiments, the speech recognizer or recognition engine can be a cloud service. Additionally, in some embodiments, the speech processing component 101 can be implemented a local server or servers, or on an individual computer. Embodiments of the present disclosure can use speech recognizers 110 and speech recognition engines that are not capable of interpreting the meaning or intent of the speech in the audio input 102. Embodiments of the present disclosure can use a plurality of speech processing components.

The transcribed speech output 112 can be the input to a semantic analyzer 120 that can use a grammar or semantic model 116 to determine a semantic interpretation result 122 (e.g., semantic meaning) of the audio input 102. In some embodiments, the semantic analyzer 120 can process standard IVR rules-based grammars (e.g., Speech Recognition Grammar Specification (SRGS)-XML standard), statistical classifiers, call a cloud or web service for Natural Language Understanding (NLU) processing, and/or any other method or combination of methods for extracting meaning from transcribed text. In various examples, an IVR system may use the semantic interpretation result 122 to initiate a response (e.g., control the speech complete detection, initiate or transfer a call to a particular unit, or the like).

Embodiments of the present disclosure can continuously process an audio input (e.g., the audio of the caller's speech) while the audio is being recorded (i.e., during a call) in addition to recorded audio inputs. The operations described with reference to FIG. 1 can be repeated at predetermined intervals during the recording of the audio. This process of repeatedly generating a start-of-speech event and/or determining the semantic interpretation result 122 (e.g., describing a semantic meaning) while audio is being captured can be referred to as iteratively performing speech recognition. As noted above, the speech processing component 101 can process the audio input 102 to generate a start-of-speech event. Additionally, the speech processing component 101 can process the audio input 102 to determine the semantic interpretation result 122 (e.g., semantic meaning) of the audio input 102 (e.g., while the user is speaking).

As noted above, and as depicted in FIG. 1, the system 100 comprises a speech processing component 101. The speech processing component 101 can be configured to process an audio input 102 (e.g., audio stream) using an input-unaware recognition process. The input-unaware recognition process can include iteratively applying a low-resolution, ever increasing audio window size to the audio input 102, as discussed in more detail herein in relation to FIG. 5. In some embodiments, the speech processing component 101 reverts to the input-unaware recognition process in response to generating a start-of-speech event. In some examples, an input-unaware recognition process does not alter behavior based on the input and simply analyzes a window of audio and reports whether it comprises silence (i.e., no input), unexpected speech (i.e., no match), or expected speech (i.e., match). In some embodiments, unexpected speech may refer to sounds (e.g., a cough, grunt, cry, or the like) that the system is not configured to recognize or respond to. In some embodiments, expected speech may refer to speech that the system is trained to recognize. Expected speech may comprise any recognizable speech or, in some examples, particular words or phrases. Accordingly, embodiments of the present disclosure may allocate computing resources for actual speech and utilize fewer computing resources when processing silence or unexpected speech (e.g., a cough, yawn, sniff, snort, or cry).

In accordance with certain embodiments, one or more of the components of FIG. 1 may be implemented using cloud services to process audio inputs, perform semantic interpretation, and other processes described above. For example, the components shown in FIG. 1 may be in the same or different cloud service environments and may communicate with each other over one or more network connections, such as, a LAN, WAN, Internet or other network connectivity. In such embodiments, speech recognizer 110, can be implemented within a cloud services environment to receive a plurality of audio windows from a speech recognizer component or another computing device that are processed in an iterative fashion in order to transcribe speech. Responsive or subsequent to transcribing the speech, the speech recognizer 110 provides the transcripts to the semantic analyzer 120, implemented in the same or different cloud services environment, over the network connection to generate the semantic interpretation result 122. The semantic analyzer 120 may determine a semantic interpretation confidence score associated with the semantic interpretation result 122. An example semantic interpretation confidence score can be a value representing the likelihood that the semantic analyzer output is correct, as discussed in more detail herein. The semantic interpretation result 122 received from the cloud service client can be processed, and the semantic meaning can be determined and output. An example IVR system can use the semantic interpretation result 122 to initiate a response (e.g., a valid semantic result can control the speech complete detection). It should be understood that embodiments of the present disclosure using cloud services can use any number of cloud-based components or non-cloud based components to perform the processes described herein.

Figure 2:
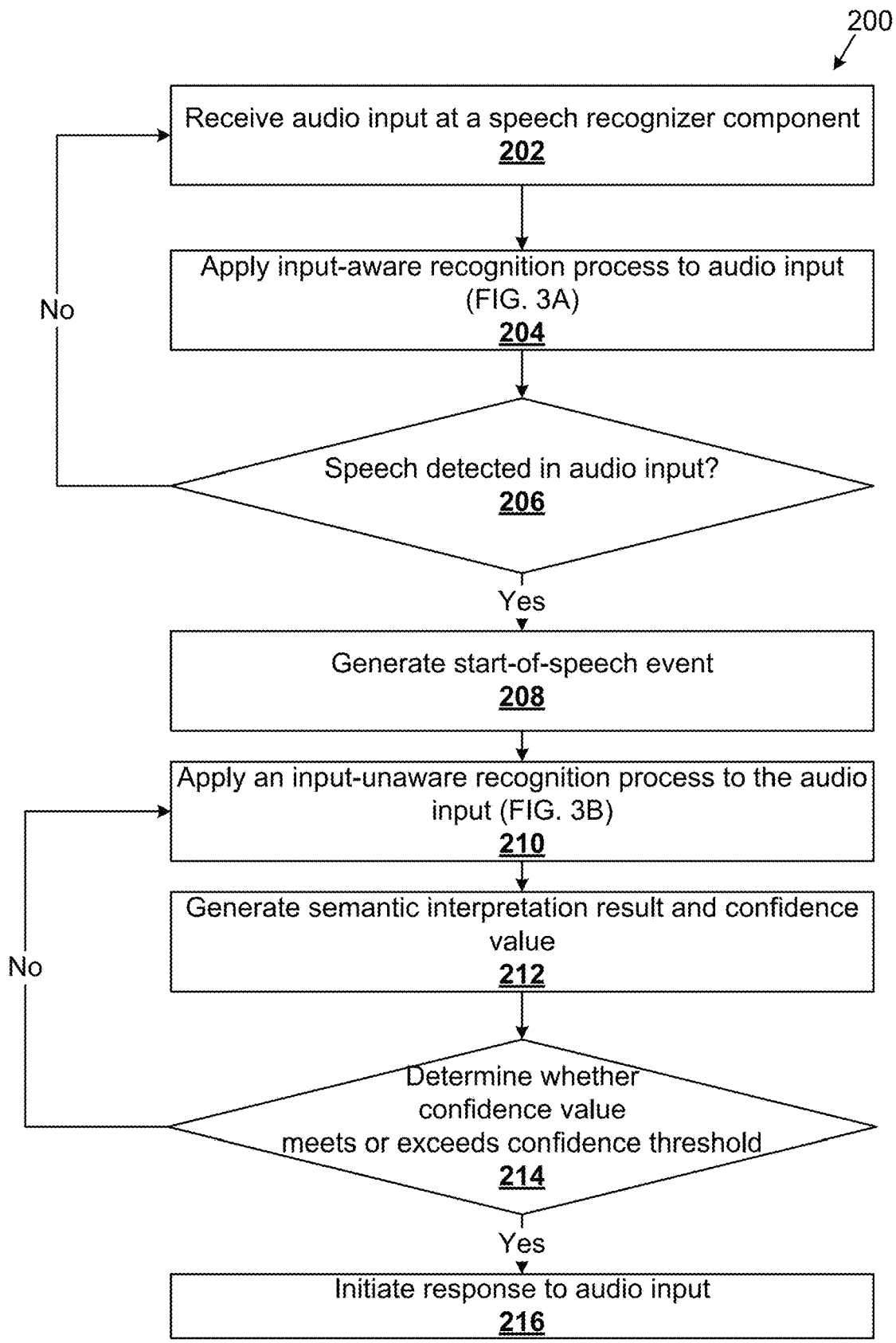
FIG. 2 illustrates an example flow diagram of operations performed to process an audio input, according to certain embodiments.

With reference to FIG. 2, embodiments of the present disclosure include methods for processing audio inputs which can include generating a start-of-speech event with respect to an audio input using an input-aware recognition process. Embodiments of the present disclosure further comprise, in response to generating the start-of-speech event, using an input-unaware recognition process to process the audio input. The method 200 illustrated in FIG. 2 can be implemented using some or all of the system components illustrated with reference to FIG. 1.

Referring now to FIG. 2, a flowchart diagram illustrating an example method 200A in accordance with some embodiments discussed herein is provided.

At block 202, an audio input (i.e., audio data, a real-time audio stream, a recording, or the like) is received at a speech processing component (e.g., speech processing component 101) which can comprise a speech detector, such as, but not limited to, the speech recognizer 110 illustrated in FIG. 1. As described with reference to FIG. 1, the speech recognizer can perform speech recognition based on the same or different recognizer language model(s) 114.

At block 204, the speech processing component can apply an input-aware recognition process to the audio input (e.g., by iteratively applying an overlapping high-frequency constant size audio window) in order to generate a start-of-speech event. In some examples, the speech processing component can generate a transcript which can be input into a semantic analyzer component. As described with reference to FIG. 1, the speech processing component can include one or more semantic analyzers (e.g., semantic analyzer 120) which in turn may comprise one or more grammatic or semantic models (e.g., grammar or semantic model 116). In some embodiments, the semantic analyzer can output a semantic interpretation result (e.g., describing a meaning of the audio input). Additional details of the input-aware recognition process are provided with reference to FIG. 3A.

At block 206, the speech processing component determines whether speech is detected in the audio input. If the speech processing component determines that there is no speech in the audio window, the method 200 returns to block 202.

At block 208, in response to detecting speech in the audio input, the speech processing component generates (e.g., identifies, detects, logs) a start-of-speech event. In some examples, the speech processing component generates a start-of-speech event based on transcribing speech using the speech recognizer or by detecting a high energy signal of a particular range or predetermined amplitude.

At block 210, in response to generating (e.g., detecting, identifying) the start-of-speech event, the system applies (e.g., triggers, activates, or the like) an input-unaware recognition process, for example, using the speech processing component 101 depicted in FIG. 1. For example, the speech processing component can iteratively apply a low-resolution increasing audio window size to the audio input, as described in more detail herein. Additional details of the input-unaware recognition process are provided with reference to FIG. 3B.

At block 212, with reference to FIG. 1, the speech processing component generates a semantic interpretation result (e.g., using semantic analyzer 120) and a confidence value that represents the likelihood that the output (e.g., semantic interpretation result 122) is correct.

At block 214, the speech processing component determines whether the confidence value associated with the semantic interpretation result meets or exceeds a confidence threshold, such as by meeting or exceeding a predetermined value. For example, if the confidence threshold is 75% and the determined confidence value is 70%, then the confidence value does not meet or exceed the threshold. In another example, if the confidence threshold is 75% and the determined confidence value is 80%, then the confidence value meets or exceeds the confidence threshold. In some embodiments, the confidence threshold may be a range of values (e.g., between 70% and 100%). In some embodiments, the speech processing component determines whether a semantic match exists for the audio input using semantic analyzers (e.g., semantic analyzer 120). As a non-limiting example, whether a semantic match exists can be determined by comparing the output from block 212 to a set of known valid responses or inputs to the system. In an instance in which the confidence value does not meet or exceed the confidence threshold, the method 200 returns to block 210 (e.g., the system may widen the audio window, as discussed in more detail below with reference to FIG. 3B).

At block 216, the system initiates a response to the audio input (e.g., if the confidence value meets or exceeds a confidence threshold). For example, the system may perform speech complete detection before finalizing the recognition result. By way of example, the input-unaware recognition process and semantic processing can detect "no speech," "no-matched speech," or "matched speech." These semantic results can be used to control speech completion detection allowing, for example, an IVR system to wait longer for input when there is silence but matched speech has not been found.

The present disclosure contemplates that the method 200 can be performed repeatedly (i.e., iteratively) any number of times as the audio data is recorded or streamed.

Figure 3A:
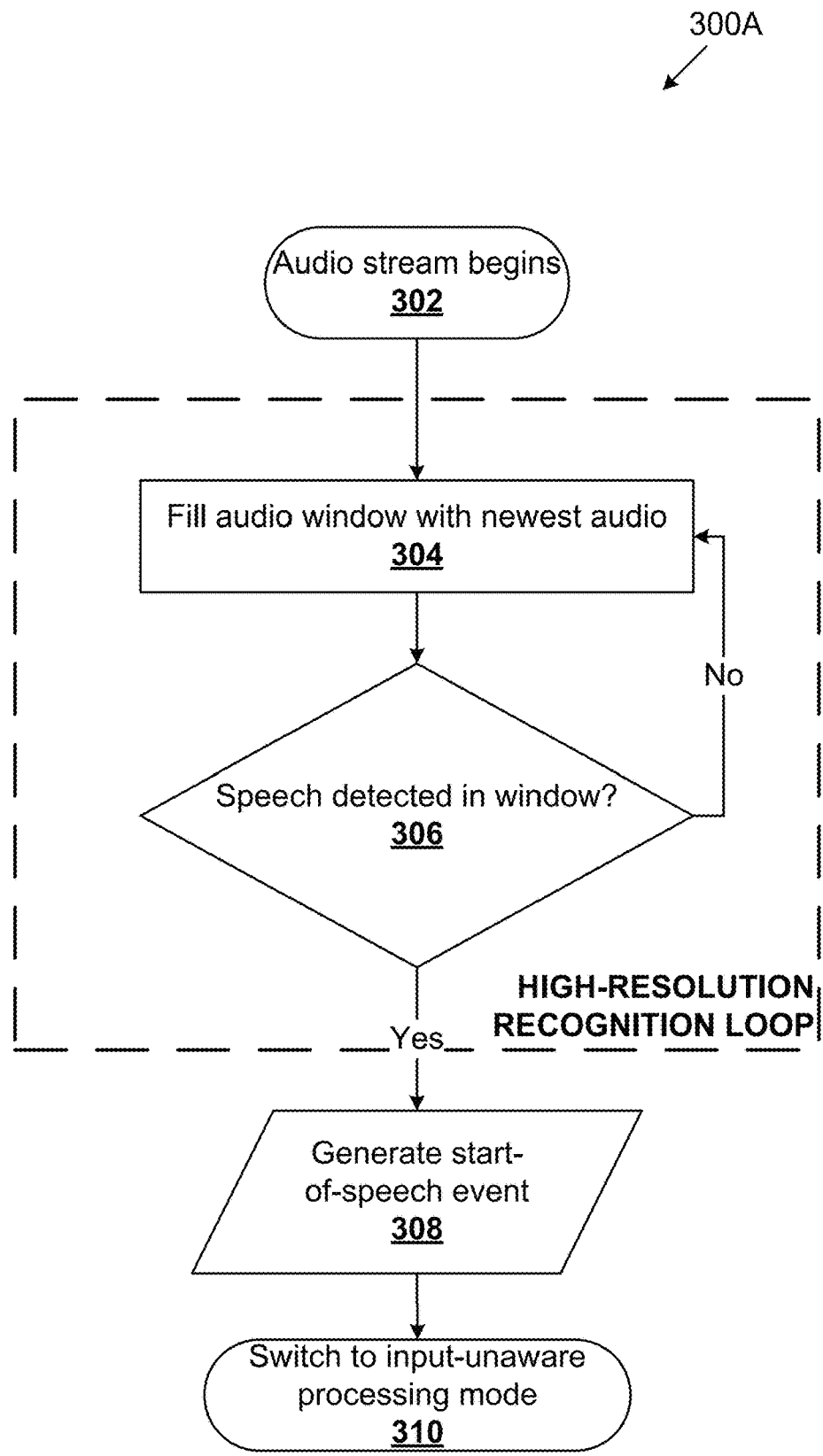
FIG. 3A illustrates an example flowchart diagram of a method for applying an input-aware recognition process, according to certain embodiments.
Figure 3B:
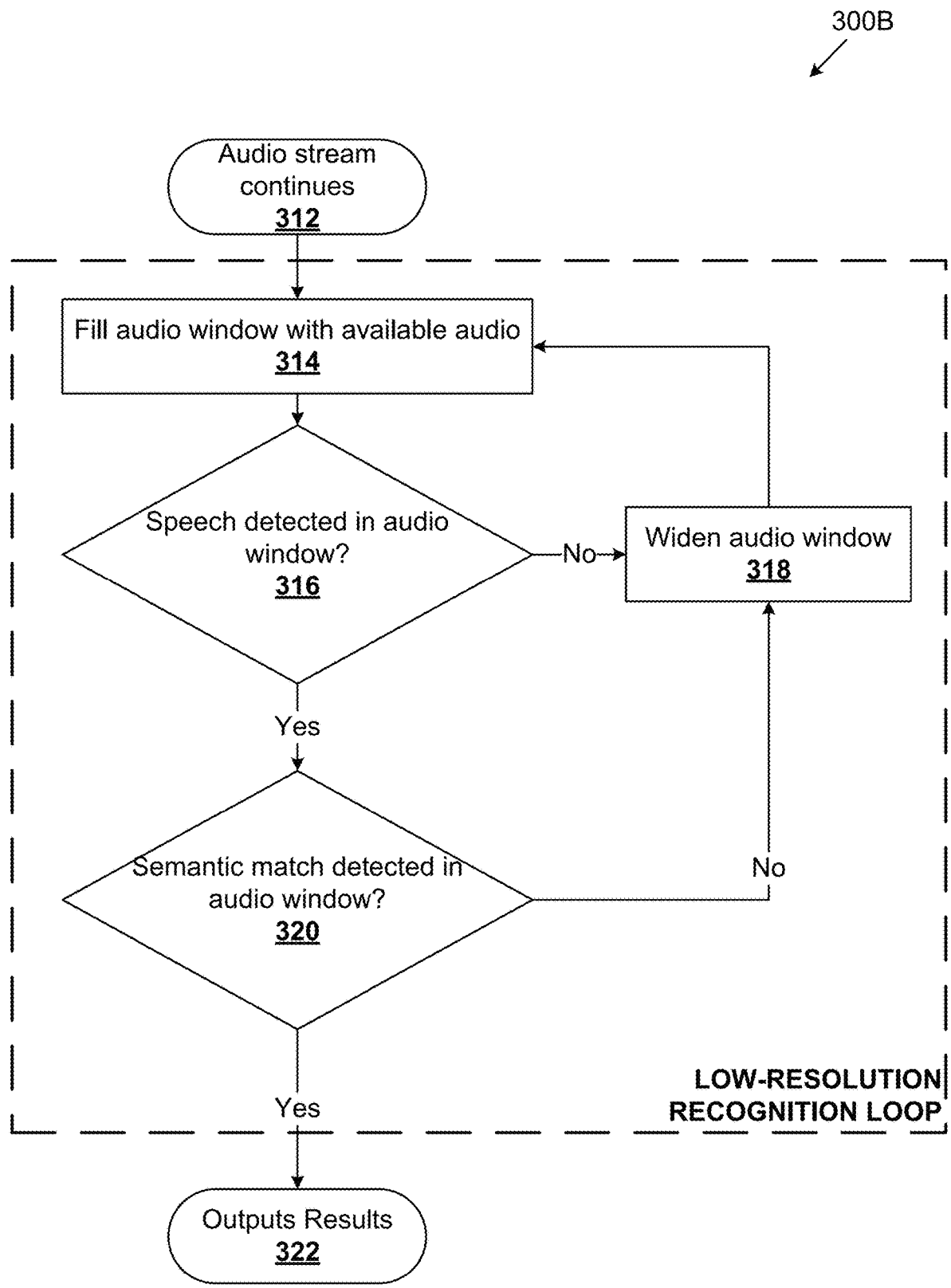
FIG. 3B illustrates an example flowchart diagram of a method for applying an input-unaware recognition process, according to certain embodiments.

FIG. 3A and FIG. 3B, provide further details of the input-aware recognition process and input-unaware recognition process, respectively. The methods 300A and 300B illustrated in FIG. 3A and FIG. 3B can be implemented using some or all of the system components illustrated with reference to FIG. 1.

Referring now to FIG. 3A, a flowchart diagram illustrating an example method 300A for applying an input-aware recognition process (e.g., using input-aware processing engine 103 discussed above) in accordance with some embodiments of the present disclosure is provided. As depicted, the method 300A may be or comprise a high-resolution recognition loop. The input-aware recognition process can include iteratively applying an overlapping, high-frequency constant size audio window in order to generate a start-of-speech event.

At block 302, an audio stream begins. For example, an audio input is received at a speech processing component, such as, but not limited to, speech processing component 101 described with reference to FIG. 1.

At block 304, the input-aware processing engine fills an audio window with the newest audio.

At block 306, the input-aware processing engine determines whether speech is detected within the audio window.

In an instance in which the input-aware processing engine does not detect speech in the audio window, the method 300A returns to block 304 where the input-aware processing engine fills the audio window with the newest audio.

At block 306, in an instance in which the input-aware processing engine detects speech in the audio window, the method 300A proceeds to block 308 where the input-aware processing engine generates (e.g., identifies, detects) a start-of-speech event. In some embodiments, the system may facilitate barge-in in response to generating the start-of-speech event.

At block 310, in response to generating the start-of-speech event, the input-aware processing engine switches to (e.g., triggers, activates, or the like) an input-unaware processing mode.

Referring now to FIG. 3B, a flowchart diagram illustrating an example method 300B for applying an input-unaware recognition process (e.g., using input-unaware processing engine 105 discussed above) in accordance with some embodiments of the present disclosure is provided. As depicted, the method 300B may be or comprise a low-resolution recognition loop. The input-unaware recognition process can include iteratively applying a low-resolution, ever increasing audio window size.

At block 312, the audio stream continues. For example, an audio input is received at a speech processing component, such as, but not limited to, speech processing component 101 described with reference to FIG. 1.

At block 314, the input-unaware processing engine fills an audio window with available audio.

At block 316, the input-unaware processing engine determines whether speech is detected within the audio window.

In an instance in which the input-unaware processing engine does not detect speech in the audio window, the method 300B proceeds to block 318 and the input-unaware processing engine widens the audio window. Subsequent to widening the audio window at block 318, the method 300B returns to block 314 and the input-unaware processing engine fills the audio window with available audio.

At block 316, in an instance in which speech is detected in the audio window, the input-unaware processing engine determines whether a semantic match is detected in the audio window at block 320.

At block 320, in an instance in which a semantic match is detected in the audio window, the method 300B proceeds to block 322 and the input-unaware processing engine outputs results (e.g., publishes or transmits the output of the method 300B). In some examples, the results may initiate speech complete detection and comprise semantic interpretation results that can be provided to an IVR system and used to facilitate various IVR operations.

EXAMPLES

Figure 4A:
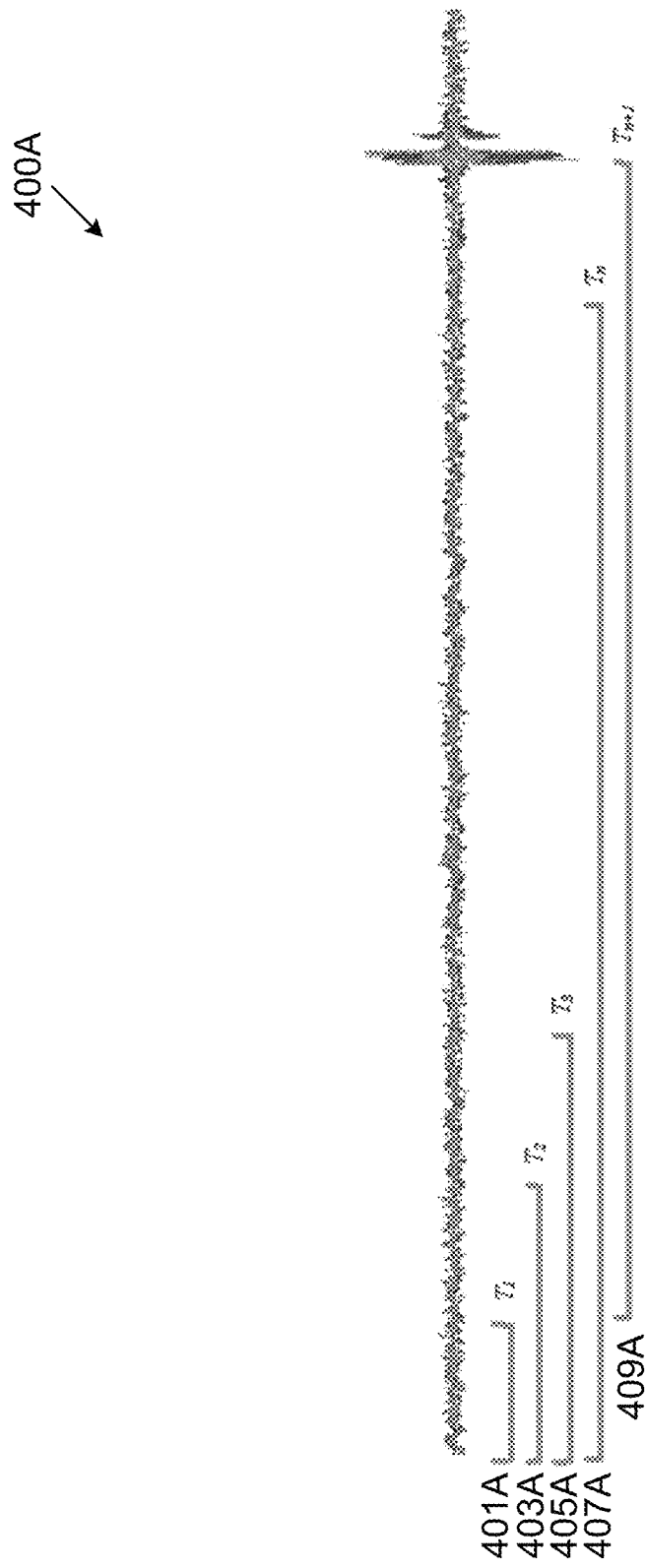
FIG. 4A, FIG. 4B, and FIG. 4C illustrate example audio input waveforms, according to certain embodiments.
Figure 4B:
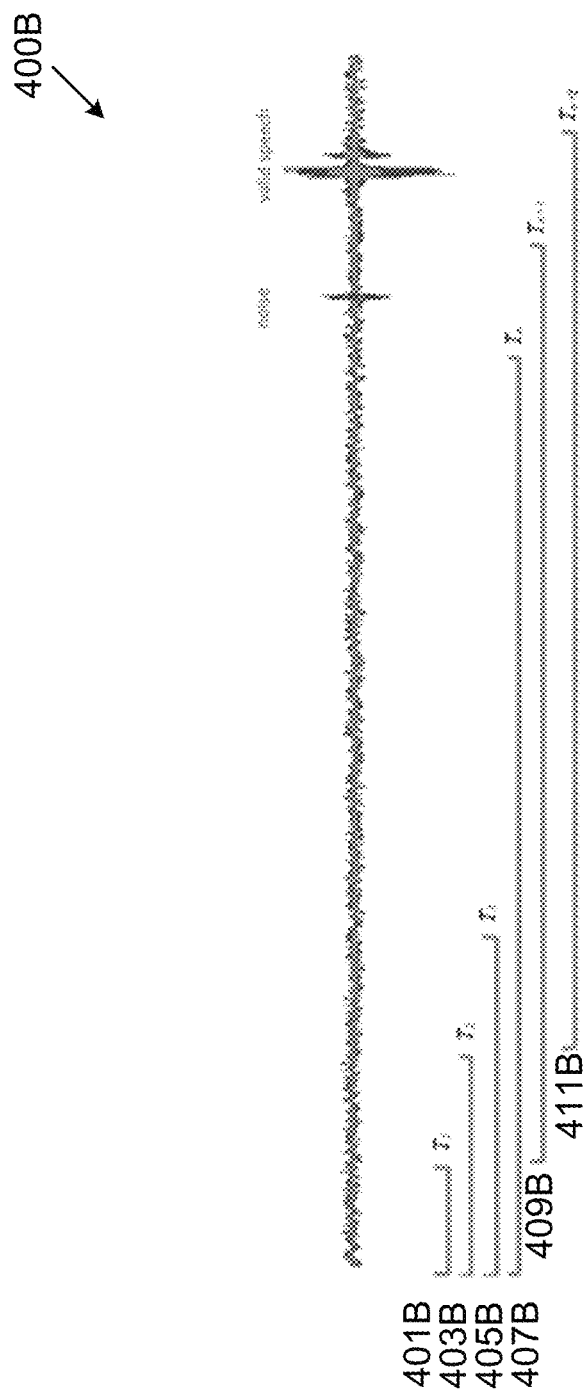
Figure 4C:
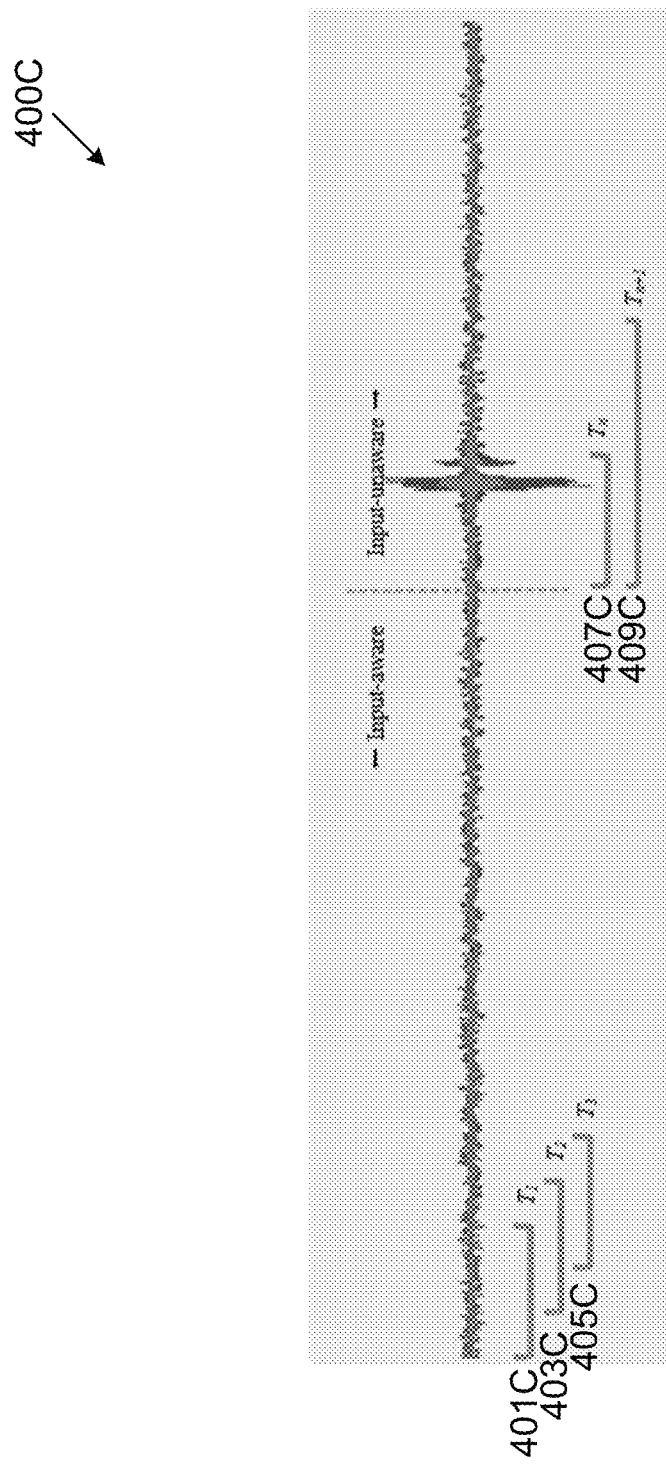

With reference to FIG. 4A, FIG. 4B, and FIG. 4C, illustrations of example audio data (e.g., the audio input received at block 202 of FIG. 2 and block 302 in FIGS. 3A and 3B) are shown. In these non-limiting examples, the system is an automated IVR system, and the system is configured to detect a apply an input-aware recognition process in order to generate a start-of-speech event. In various embodiments, in response to generating the start-of-speech event, the system is configured to apply an input-unaware recognition process to a remaining audio input to determine silence, unexpected speech, or expected speech. For example, the system can be configured to identify one or more predetermined phrases (e.g., the phrase "pay my bill" as a semantic match) that can cause the processor to initiate an appropriate response (e.g., bill paying operations).

FIG. 4A shows an example of an audio waveform 400A for a caller to which an input-unaware recognition process is applied. In particular, FIG. 4A depicts a widening window over an audio waveform that can be utilized to distinguish between noise and valid speech.

As depicted in FIG. 4A, silence arrives in first audio window 401A ($T_1$), second audio window 403A ($T_2$), third audio window 405A ($T_3$) and fourth audio window 407A ($T_n$). As silence arrives in the audio windows 401A, 403A, 405A, and 407A (i.e., $T_1$ through $T_n$), no speech is detected. As further depicted, substantial noise occurs in a fifth audio window 409A ($T_{n+1}$). In the example depicted in FIG. 4A, the fifth audio window 409A ($T_{n+1}$) may be sent to the speech recognition engine. At the fourth audio window 407A ($T_n$), the window has reached its maximum size and at the fifth audio window 409A ($T_{n+1}$) it begins to slide.

FIG. 4B shows another example of an audio waveform 400B for a caller to which an input-unaware recognition process is applied. In particular, FIG. 4B also depicts a widening window over an audio waveform that can be utilized to distinguish between noise and valid speech.

As depicted in FIG. 4B, silence arrives in a first audio window 401B ($T_1$), second audio window 403B ($T_2$), third audio window 405B ($T_3$) and fourth audio window 407B ($T_n$). As silence arrives in the audio windows 401B, 403B, 405B, and 40BA (i.e., $T_1$ through $T_n$), no speech is detected. As further depicted, substantial noise occurs in a fifth audio window 409B ($T_{n+1}$). At the fourth audio window 407B ($T_n$), the window has reached its maximum size and at the fifth audio window 409B ($T_{n+1}$) it begins to slide. In the example depicted in FIG. 4B, the fifth audio window 409A ($T_{n+1}$) may be sent to the speech recognition engine. In accordance with embodiments of the present disclosure, the speech recognition engine may analyze the fifth audio window 409B ($T_{n+1}$) and correctly determine that the noise is not a start-of-speech event (e.g., in an IVR application, barge-in would not occur). However, the speech recognition engine may analyze a subsequent audio window and correctly generate a start-of-speech event. As depicted, the speech recognition engine may analyze a sixth audio window 411B ($T_{n+2}$) and correctly generate a start-of-speech event resulting in valid speech detection by the speech recognizer.

As each window of audio arrives, it is sent to a speech recognition engine for processing. If the speech recognition engine does not detect valid speech in the audio sample, it is treated as no-input and the recognizer waits for the next window to be buffered. This allows the system to leverage the speech recognition engine to detect sound and distinguish noise from actual speech. Signal processing systems may often trigger a start-of-input event when noise such as a cough or grunt arrives. A speech recognition engine will not detect valid speech in the audio frames of noise and this approach will not trigger a start-of-input event until some valid recognizable speech is detected.

FIG. 4C shows yet another an example of an audio waveform 400C for a caller. As depicted in FIG. 4C, in a first portion of the audio waveform 400C during which no start-of-speech event is generated, the system applies an input-aware recognition process to the audio input. Embodiments of the present disclosure, including the system of FIG. 1 and the method illustrated in FIG. 2, can be configured to iteratively apply overlapping high-frequency constant size audio windows to the audio input.

As depicted, the recognition process begins with a high-frequency, constant size audio window while only silence is detected. Specifically, the system obtains a first audio window 401C ($T_1$), a second audio window 403C ($T_2$), and a third audio window 405C ($T_3$), which are overlapping. As further depicted, each audio window 401C, 403C, and 405C has a constant size and duration (e.g., 15 milliseconds or 0.5 seconds). In various examples, constant size audio windows facilitate rapid processing which is suitable for detecting, in some examples, a single word or a portion of a word which is sufficient for generating a start-of-speech event. In other words, at this stage the speech recognition engine may not need to determine the meaning of the detected speech.

As further depicted in FIG. 4C, each audio window 401C, 403C, and 405C partially overlaps with at least one other audio window (e.g., a preceding audio window). As shown, the second audio window 403C overlaps with the first audio window 401C, and the third audio window 405C overlaps with the second audio window 403C and the first audio window 401C. In various examples, overlapping audio windows are used to more accurately identify speech such as words or phrases. By way of example only, a series of audio windows may comprise the following audio sequence:

First audio window ($T_1$)="s"
Second audio window ($T_2$)="su"
Third audio window ($T_3$)="sur"
Fourth audio window ($T_4$)="sure"

In the above example, because the audio windows overlap the speech recognition engine is able to correctly identify speech. For instance, if the audio windows don't overlap, the speech recognition engine may incorrectly determine that each audio window that is analyzed contains noise (e.g., first audio window, "s" and second audio window, "ure").

As further depicted in FIG. 4C, in a second (i.e., later, subsequent) portion of the audio waveform 400C, and in response to generating a start-of-speech event, the system applies an input-unaware recognition process to the remaining audio input. Embodiments of the present disclosure, including the system of FIG. 1 and the method illustrated in FIG. 2A, can be configured to iteratively apply a low-resolution increasing audio window size to the audio input. For example, the system may not initiate a barge-in response or IVR operations until a start-of-speech event is generated.

In particular, as depicted, during the input-unaware recognition process, the system obtains a fourth audio window 407C ($T_n$) and a fifth audio window 409C ($T_{n+1}$). As depicted in FIG. 4C, during the input-unaware recognition process, the duration of the fifth audio window 409C is larger than the fourth audio window 407C (i.e., includes the entirety of the fourth audio window 407C). An example recognition window can begin at size 0, expanding with the incoming audio input to a predetermined maximum window size. The maximum window size may be a configurable parameter that can be adjusted by an administrator or using client parameters (e.g., hotword mode which processes audio until a particular word is uttered or normal mode which processes audio until a certain duration of silence is detected). In general, the maximum window size must be large enough to accommodate the longest expected utterance. In some embodiments, this window will eventually begin to widen as the collected audio surpasses the maximum. As depicted in FIG. 4C, the input-unaware recognition process illustrates a widening window over an audio input. At the audio window has reached its maximum size and at it begins to widen. As each window of audio arrives, it is sent to a speech recognition engine for processing. If the speech recognition engine does not detect valid speech in the audio sample, it is treated as no-input and the speech recognition engine waits for the next window to be buffered. This allows the system to leverage the speech recognition engine to detect sound and distinguish noise from actual speech. Signal processing systems may often trigger a start-of-input event when noise such as a cough or grunt arrives. A speech recognition engine will not detect valid speech in the audio frames of noise and this approach will not trigger a start-of-input event until some valid recognizable speech is detected.

FIGS. 4A, 4B and 4C illustrate how this approach can distinguish between noise and valid speech. As silence arrives in windows $T_1$ through $T_3$, no speech is detected. Substantial noise occurs in window $T_n$. The window of audio $T_n$ would be sent to the speech recognition engine. The speech recognizer will detect valid speech and the start-of-speech event will be triggered.

By switching from an input-aware recognition process to an input-unaware recognition process in response to generating a start-of-speech event, embodiments of the present disclosure conserve computing resources and are more accurate with respect to IVR operations, including triggering a barge-in response to detected speech. With per-recognition resource usage increasing over time for each active session (and potentially many concurrent sessions), a balance between resolution—that is, responding quickly to particular words—and resource usage is required. Combining this approach with standard signal-processing-based activity detection can provide other benefits. In the example depicted in FIGS. 4A, 4B and 4C, activity detection can be used to distinguish between silence from sound as each sliding window of audio is processed. The sliding window of audio is collected as described above. However, in some embodiments, each window is first processed using signal-processing based activity detection. If no sound is detected by the activity detector, the audio data may not need to be processed by the speech recognition engine.

Figure 5:
FIG. 5 illustrates a table of speech transcriptions and results for an example audio input, according to certain embodiments.

With reference to FIG. 5, an operational example for processing an audio input using an input-aware recognition process and an input-unaware recognition process is provided. In particular, FIG. 5 illustrates a table 500 showing an example of the speech transcription output and semantic match output for the timeframes of 0 to 3 seconds. It should be understood that each audio window may be separately transmitted to the system. Embodiments of the present disclosure can be configured to continuously process the audio input (e.g., the audio waveform 400C depicted in FIG. 4C) using an input-aware recognition process and switch to (e.g., trigger, activate, or the like) an input-unaware recognition process in response to generating a start-of-speech event. As depicted, the example system iteratively applies an overlapping high-frequency constant size audio window to an audio input between 0 and 0.5 seconds, 0.2 and 0.7 seconds, 0.5 and 1 second, and 0.8 and 1.3 seconds. Then, the example system generates a start-of-speech event that occurs during a particular audio window between 0.8 and 1.3 seconds. Accordingly, the system then begins to iteratively apply a low-resolution, ever increasing size audio window to the audio input until a semantic match is found or a timeout occurs. In some embodiments, the system may stop analyzing (e.g., recording) the audio input when a semantic match has been recognized, or in response to subsequently detecting a period of silence that lasts for a predetermined time period. In some embodiments, the system may switch back to the input-aware recognition process in response to recognizing a semantic match or detecting a period of silence that lasts for a predetermined time period. During the input-unaware recognition process, the system can be configured to process each audio window and perform semantic interpretation. For example, once a start-of-speech event is generated during the input-aware recognition process, the system iteratively applies a low-resolution, increasing size audio window (i.e., between 1.1 and 1.6 seconds, 1.1 and 2.3 seconds, and 1.1 and 3 seconds). So, if the phrase "I want to" or "I want to pay" are not semantic matches, the system can be configured to continue recording audio between 1.1 and 3. Then, when the audio input "I want to pay my bill" is received, the semantic analyzer can determine that the audio input "I want to pay my bill" is a semantic match. The result will be a semantic match and the application will know the caller's intent was to pay their bill.

By switching to the input-unaware recognition process in response to generating a start-of-speech event, the responsiveness of the system is improved. For example, a detected sound that does not comprise speech will not trigger barge-in operations in an IVR system. Additionally, by implementing the input-unaware recognition process only in response to a start-of-speech event, computing resources are conserved. This can further allow the system to be more responsive and more quickly respond to the user if their input represents a semantic match.

Figure 6:
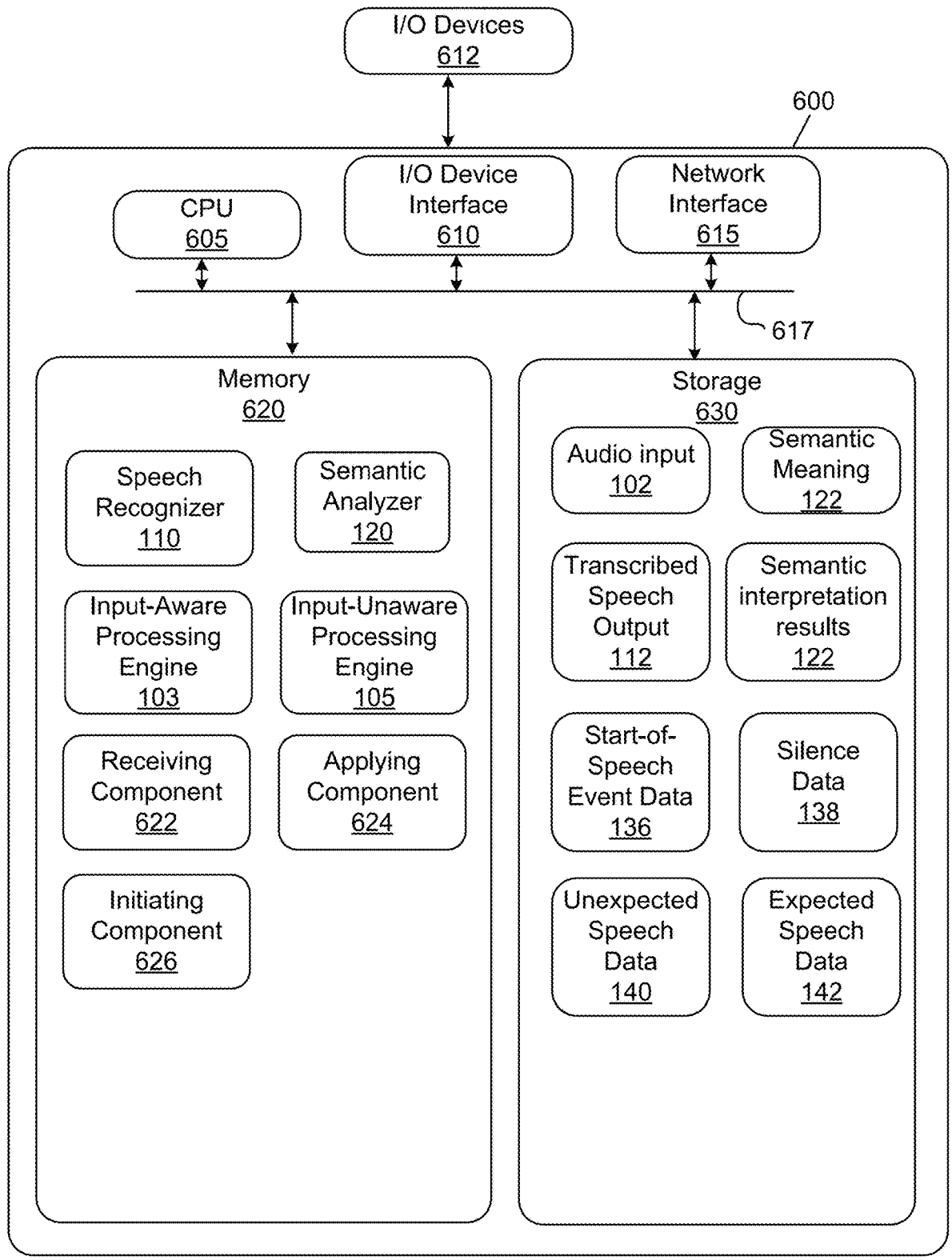
FIG. 6 illustrates example computing systems that may be utilized according to certain embodiments.

FIG. 6 illustrates an example of a computer system 600 that may include the kinds of software programs, data stores, and hardware according to certain embodiments. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, and mouse devices) to the computing system 600. Further, the computing elements shown in computing system 600 may correspond to a physical computing system (e.g., a system in a data center) or may be a virtual computing instance executing within a computing cloud.

The CPU 605 retrieves and executes programming instructions stored in memory 620 as well as stored in the storage 630. The bus 617 is used to transmit programming instructions and application data between the CPU 605, I/O device interface 610, storage 630, network interface 615, and memory 620. Note, CPU 605 is included to be representative of a single CPU, multiple CPUs, a single CPU having multiple processing cores, and the like, and the memory 620 is generally included to be representative of random-access memory. The storage 630 may be a disk drive or flash storage device. Although shown as a single unit, the storage 630 may be a combination of fixed and/or removable storage devices, such as fixed disc drives, removable memory cards, optical storage, network-attached storage (NAS), or a storage area network (SAN).

Illustratively, the memory 620 includes the speech recognizer 110, the semantic analyzer 120, an input-aware processing engine 103, an input-unaware processing engine 105, a receiving component 622 (e.g., configured to receive audio inputs), an applying component 624 (e.g., configured to apply an input-aware recognition process and/or an input-unaware recognition process), and an initiating component 626 (e.g., configured to initiate a response in accordance with an audio input).

Further, the storage 630 includes the audio input 102 and the transcribed speech output 112 output by the speech recognizer 110 (e.g., strings of transcribed text), as well as the semantic interpretation result(s) 122, all of which are also discussed in greater detail above. The storage 630 can also include the semantic interpretation result 122 (e.g., semantic meaning). As further depicted in FIG. 6, the storage 630 includes start-of-speech event data 136, silence data 138, unexpected speech data 140, and expected speech data 142.

Figure 7A:
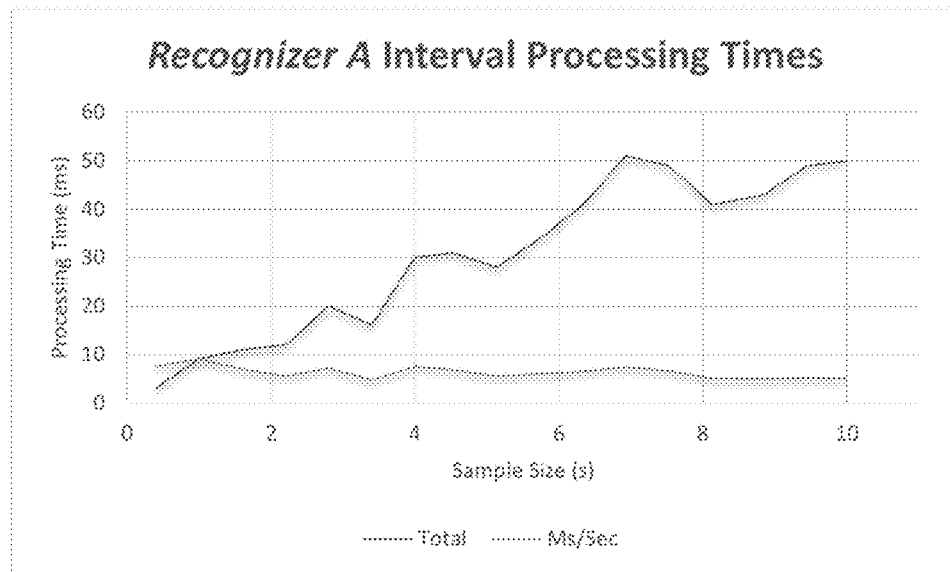
FIG. 7A and FIG. 7B illustrate example graphs, according to certain embodiments.
Figure 7B:
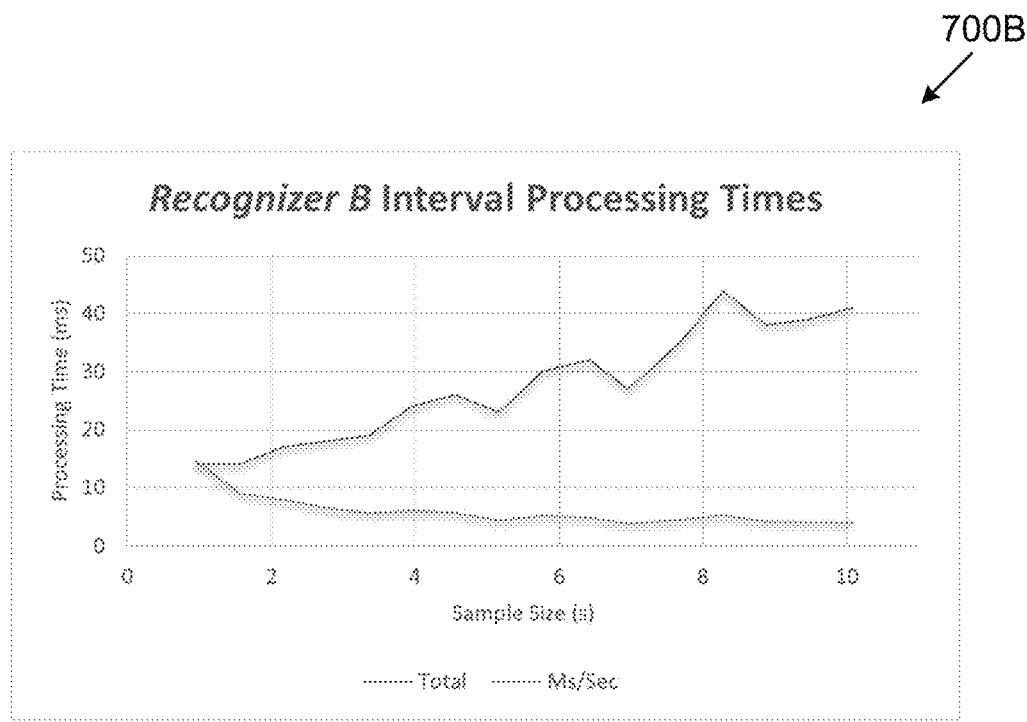

FIG. 7A and FIG. 7B illustrate example graphs 700A and 7009 in accordance with some embodiments of the present disclosure. As depicted in each graph 700A and 7009, the x-axis represents audio window sizes and the y-axis represents instances in time measured in milliseconds.

FIG. 7A and FIG. 7B illustrate that per-recognition resource usage increases as the window size increases because the system is analyzing more audio data. According to the results shown in FIG. 7A and FIG. 7B, CPU usage is mostly constant for a given unit of time, but the overall time to process is proportional to the length of audio. Accordingly, an input-aware recognition process will use fewer computing resources by utilizing a constant size audio window. Additionally, in some examples, using small audio windows allows for higher resolutions, consuming fewer overall resources than slower, larger audio windows.

Figure 8A:
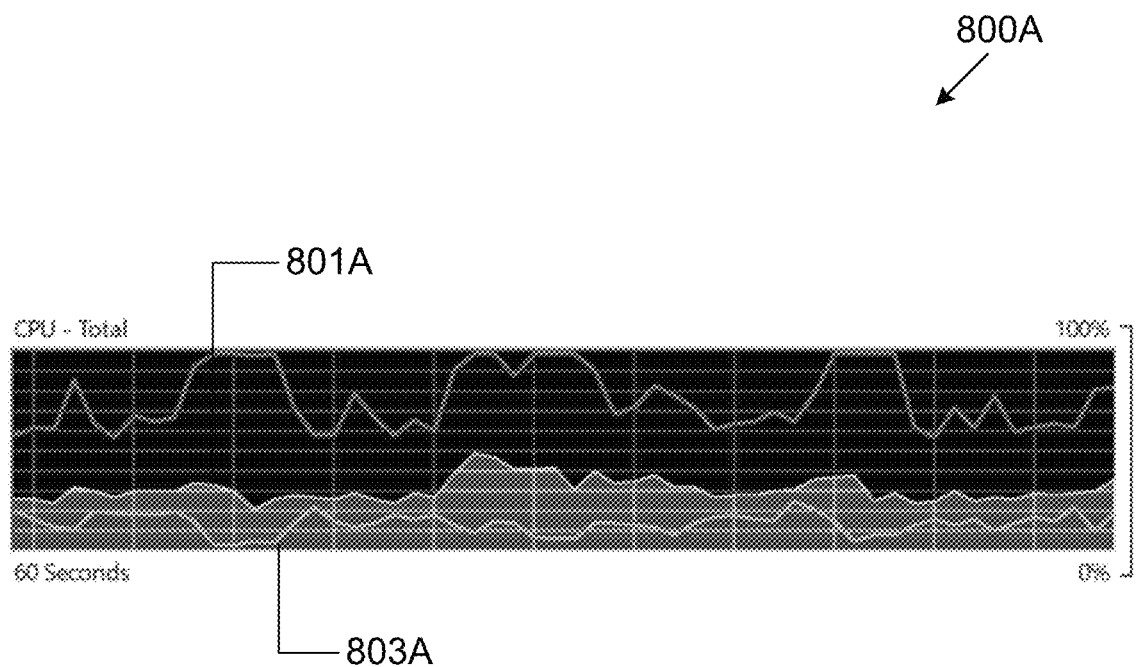
FIG. 8A and FIG. 8B illustrate example graphs, according to certain embodiments.
Figure 8B:
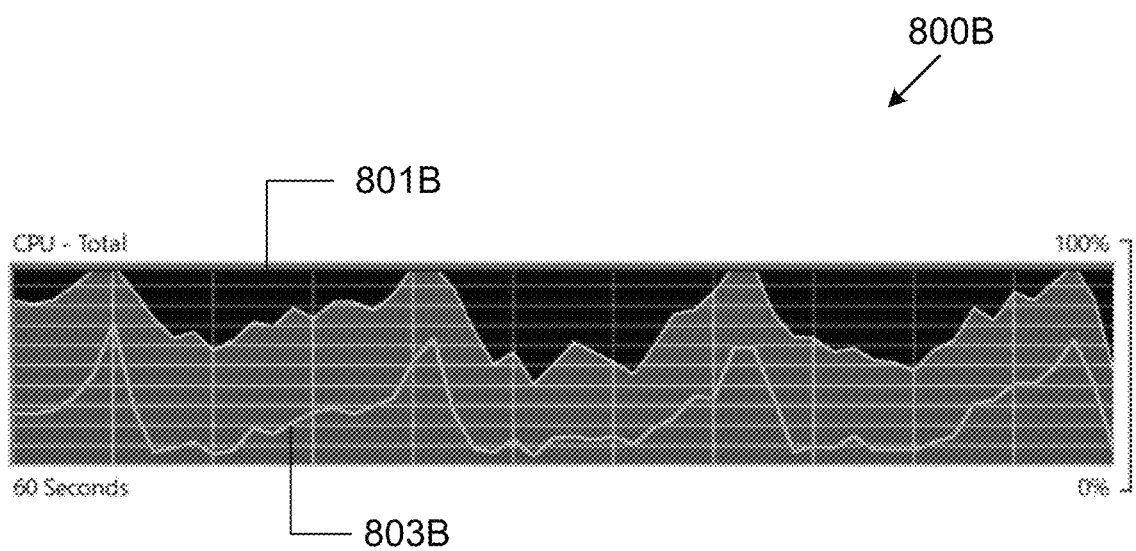

FIG. 8A and FIG. 8B illustrates example graphs 800A and 800B in accordance with some embodiments of the present disclosure. As depicted in FIG. 8A and FIG. 8B, the x-axis represents instances in time measured in seconds, and the y-axis represents overall CPU usage using an input-aware recognition process and an input-unaware recognition process, respectively.

As depicted in FIG. 8A, a first line 801A of the graph 800A represents the available CPU processing power. As further depicted, a second line 803A of the graph 800A represents overall CPU usage associated with an input-aware recognition process, averaging 15.76%. Notably, the second line 803A of the graph 800A has few peaks indicating that the input-aware recognition process allows the CPU to achieve low-latency processing during recognition sessions.

As depicted in FIG. 8B, a first line 8019 of the graph 800B represents the available CPU processing power. As shown, all available CPUs are online due to processing requirements for an input-unaware recognition process. As further depicted, a second line 8039 of the graph 800B represents overall CPU usage associated with the input-unaware recognition process, averaging 27%. As illustrated in FIG. 8B, the CPU usage produces a sawtooth pattern that is attributable to the increasingly larger window sizes associated with the input-unaware recognition process.

Accordingly, FIG. 8A and FIG. 8B illustrate that using the methods described herein, CPU usage can be significantly reduced. For example, by not increasing the size of audio windows during an input-aware recognition process (depicted in FIG. 8A), the processing power required remains mostly constant, and such embodiments of the present disclosure may significantly reduce overall CPU usage by approximately 28%.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment. For example, the components described herein can be hardware and/or software components in a single or distributed systems, or in a virtual equivalent, such as, a cloud computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Thus, the system 100 and implementations therein described in the present disclosure allow a telephone system using a speech processing component that does not perform semantic interpretation to responsively and accurately respond to user inputs.

What is claimed:

1. A method for processing an audio input using an iterative speech recognition system, the method comprising:
   receiving the audio input at a speech processing component;
   applying an input-aware recognition process to the audio input to generate a start-of-speech event;
   responsive to generating the start-of-speech event, applying an input-unaware recognition process to a remaining audio input to determine silence, unexpected speech, or expected speech; and
   initiating a response in accordance with a result of the input-unaware recognition process.

2. The method of claim 1, wherein the input-aware recognition process comprises iteratively analyzing the audio input using an overlapping, high-frequency constant size audio window.

3. The method of claim 1, wherein the input-unaware recognition process comprises iteratively analyzing the audio input using an increasing audio window size.

4. The method of claim 1, wherein applying the input-unaware recognition process further comprises:
   generating a semantic interpretation result describing a semantic meaning of the audio input.

5. The method of claim 4, further comprising:
   using the semantic interpretation result to control speech complete detection.

6. The method of claim 1, wherein determining a semantic meaning of the audio input further comprises:
   generating a confidence value associated with the semantic meaning.

7. The method of claim 6, further comprising:
   determining whether the confidence value meets or exceeds a confidence threshold.

8. A computer system for processing an audio input, the system comprising:
   a processor; and
   a memory operably coupled to the processor, the memory having computer-executable instructions stored thereon that, when executed by the processor, causes the system to:
   receive the audio input at a speech processing component;
   apply an input-aware recognition process to the audio input to generate a start-of-speech event;
   responsive to generating the start-of-speech event, apply an input-unaware recognition process to a remaining audio input to determine silence, unexpected speech, or expected speech; and
   initiate a response in accordance with a result of the input-unaware recognition process.

9. The computer system of claim 8, wherein the input-aware recognition process comprises iteratively analyzing the audio input using an overlapping, high-frequency constant size audio window.

10. The computer system of claim 8, wherein the input-unaware recognition process comprises iteratively analyzing the audio input using an increasing audio window size.

11. The computer system of claim 8, wherein applying the input-unaware recognition process further comprises:
    generating a semantic interpretation result describing a semantic meaning of the audio input.

12. The computer system of claim 11, wherein the computer-executable instructions further include instructions to cause the processor to:
    use the semantic interpretation result to control speech complete detection.

13. The computer system of claim 11, wherein the computer-executable instructions further include instructions to cause the processor to:
    generate a confidence value associated with the semantic meaning.

14. The computer system of claim 13, wherein the computer-executable instructions further include instructions to cause the processor to:
    determine whether the confidence value meets or exceeds a confidence threshold.

15. A non-transitory computer readable medium comprising instructions that, when executed by a processor of a processing system, cause the processing system to perform a method for processing an audio input, comprising instructions to:
    receive the audio input at a speech processing component;
    apply an input-aware recognition process to the audio input to generate a start-of-speech event;
    responsive to generating the start-of-speech event, apply an input-unaware recognition process to a remaining audio input to determine silence, unexpected speech, or expected speech; and
    initiate a response in accordance with a result of the input-unaware recognition process.

16. The non-transitory computer readable medium of claim 15, wherein the input-aware recognition process comprises iteratively analyzing the audio input using an overlapping, high-frequency constant size audio window.

17. The non-transitory computer readable medium of claim 15, wherein the input-unaware recognition process comprises iteratively analyzing the audio input using an increasing audio window size.

18. The non-transitory computer readable medium of claim 15, wherein applying the input-unaware recognition process further comprises:
   generating a semantic interpretation result describing a semantic meaning of the audio input.

19. The non-transitory computer readable medium of claim 18, wherein the instructions further include instructions to cause the processor to:
   generate a confidence value associated with the semantic meaning.

20. The non-transitory computer readable medium of claim 19, wherein the instructions further include instructions to cause the processor to:
   determine whether the confidence value meets or exceeds a confidence threshold.

* * * * *